(No Model.)
J. QUIGLEY.
POINTING IMPLEMENT.
No. 584,292.  Patented June 8, 1897.
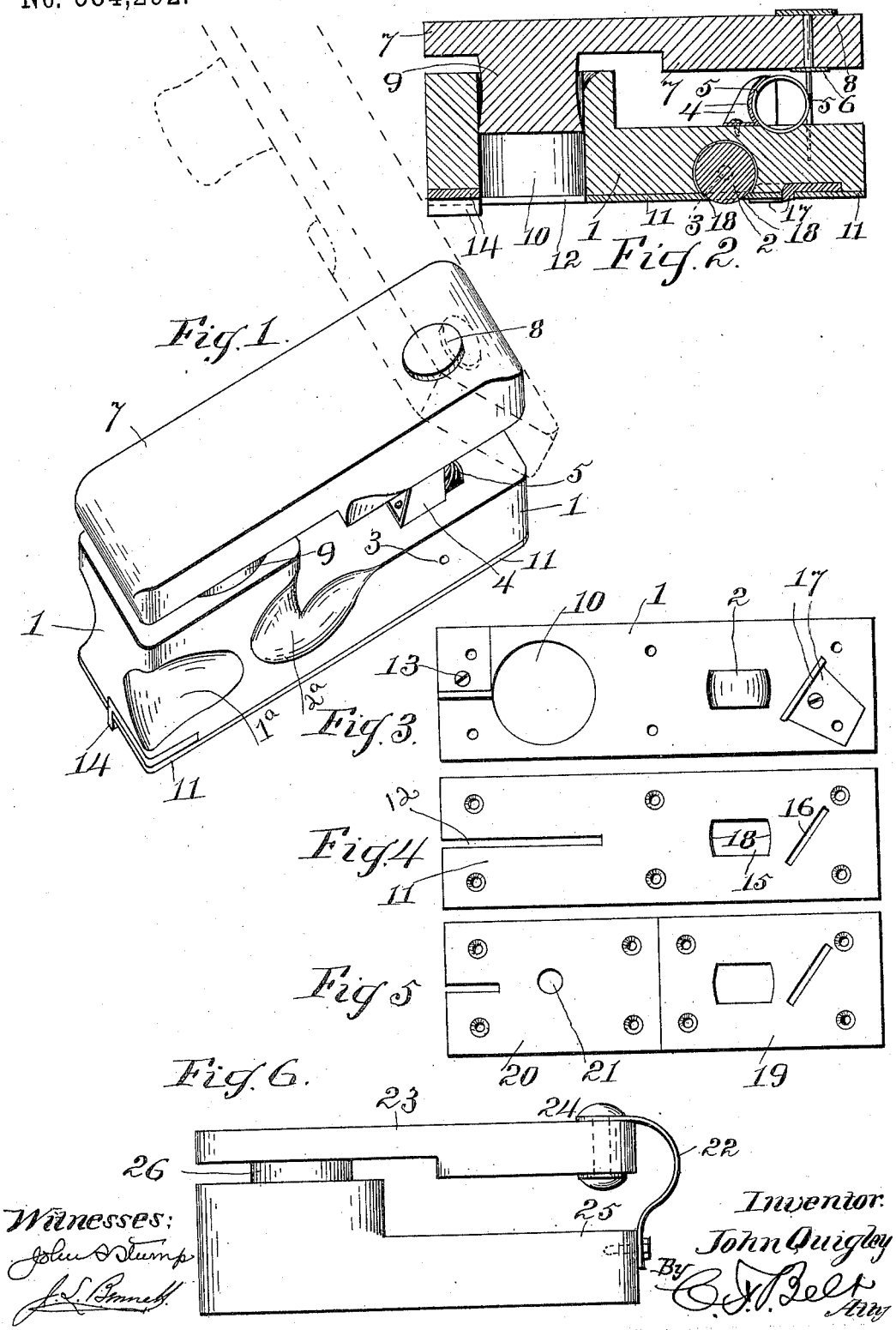

UNITED STATES PATENT OFFICE.

JOHN QUIGLEY, OF BLOSSBURG, PENNSYLVANIA.

POINTING IMPLEMENT.

SPECIFICATION forming part of Letters Patent No. 584,292, dated June 8, 1897.

Application filed July 29, 1896. Serial No. 600,972. (No model.)

*To all whom it may concern:*

Be it known that I, JOHN QUIGLEY, a citizen of the United States, residing at Blossburg, in the county of Tioga and State of Pennsylvania, have invented certain new and useful Improvements in Pointing Implements, of which the following is a specification.

This invention relates to an implement to be used in pointing up brickwork, stone masonry, and plasterers' and painters' work; and the novelty, ingenuity, and resultant advantages of the invention will be fully understood from the following description and claims when taken in connection with the annexed drawings.

The prime object of the invention is to provide a tool or implement which will clear out a joint or other place to be pointed up, feed the pointing substance into place, embed it there, and cut or scrape off the overflow.

A further object of the invention is to provide a tool or implement having a chamber or cup and a spring-controlled hand-lever carrying a plunger to force the contents of the cup out as desired.

A further object of the invention is to provide an implement of the character referred to with a spring-controlled plunger hand-lever pivoted to the spring and adapted to be turned out of line with the implement.

A still further object of the invention is to provide an implement for builders, painters, and other workmen adapted to be charged with a substance or material and means for discharging the same, as desired, by pressure of the hand in holding the implement.

Other objects and advantages accruing from my improved implement will be revealed in the specification to follow.

The invention consists in the novel construction and arrangement of parts and resides, essentially, in an implement having a chamber or cup and comprising all the elements necessary to feed pointing material into place, manipulate it there, and leave the surface clear and smooth by a single operation.

In the accompanying drawings, forming part of this application, Figure 1 is a perspective view of my implement ready for use, showing in dotted lines the plunger raised and the lever turned on its pivot to one side. Fig. 2 is a longitudinal section. Fig. 3 is a bottom plan view with the surface-plate removed, showing the clearing-blade and the scraper-knife secured in place. Fig. 4 is a plan view of the surface-plate. Fig. 5 is a plan view of a modification. Fig. 6 is a side elevation of a further modification.

The same numeral-references denote the same parts throughout the several figures of the drawings.

The body 1 of the implement has housed therein a roller 2, which projects beyond the bottom and is journaled upon an arbor 3, extending across the body. Secured in a housing 4 upon the top of the body 1 is a coil-spring 5, having one end attached to said body and the other end provided with a washer 6 and extending through the lever 7, where it is provided with a cap or head 8. The lever is thus pivoted upon the said spring end between the washer and cap, leaving it free to be turned transversely and also to be operated vertically.

The free end of the lever 7 is provided with a plunger 9 to engage a cup or chamber 10, forming a well for the pointing material. The bottom of the cup is formed by a portion of the surface-plate 11, which partially covers the bottom of the cup and is attached to the bottom of the implement, having a slot 12, through which the pointing material is discharged in desired quantities according to the pressure upon the plunger-lever.

Between the bottom of the implement and the plate 11 is secured, by means of a screw 13, the clearing-knife 14, the edge of which extends through the slot 12 and projects beyond the surface of the plate. This knife is provided to clear out a channel or make clear the line between the bricks, planks, or stone for the purpose of feeding in the pointing material.

The roller 2 projects through an aperture 15 in the plate 11 and follows in a direct line the slot 12, to force and pack the pointing material in place immediately upon leaving the slot.

Secured between the plate 11 and the bottom of the implement in the rear of the roller and projecting through a slot 16, diagonally across the said plate, is the scraping-knife 17, which takes off all superfluous material and smooths the material in the joint down flush with the wall or other place being worked, and gives a perfectly even and finished appearance.

The body has hand grasping portions 1ᵃ and 2ᵃ for convenience and comfort in holding the implement. The aperture 15 has knife-edges 18, which hug the roller 2 closely, to keep the surface clear and prevent the roller carrying any of the pointing material into the body of the implement.

It will be observed that the knives 14 and 17 may be readily removed and replaced without entirely removing the plate 11 by simply removing the screws which hold them in place.

Referring now to the modification shown in Fig. 5, the plate is divided into two parts 19 and 20, the part 19 being the same as hereinbefore set up; but the part 20 has one or more apertures 21, and is desirable in lieu of the slot to make a confined deposit of the pointing material.

Referring to Fig. 6, which shows a further modification, I have supplanted the coil-spring with a plate-spring 22, which has the plunger-lever 23 pivoted at 24 thereto, and is secured to the end of the body at 25. This spring tends to hold the plunger 26 in the well until removed and turned to one side or the other on the said pivot 24.

In operating the tool the cup is given a charge of pointing material and the plunger entered into the cup. The cutting-blade is then started into a crevice, joint, or other place to be pointed, and cuts or clears out such place, whereupon the pointing material is forced by pressure upon the plunger through the discharge-opening in the bottom of the cup as the tool is moved along said crevice or space. The roller following in line forces or presses the material into the crevice, and the scraper which follows the roller evens or smooths off any superfluous pointing material that may be left on the edges of the crevice.

It is obvious that this implement may be applied for many various uses besides those hereinbefore enumerated, and I therefore do not confine its adaptability. It is also obvious that the parts of the device may be changed relative to each other and the parts altered to effect best results without departing from the spirit of my invention.

Having thus described my invention, what I claim as new, and desire to secure by Letters Patent, is—

1. A pointing-tool consisting of a body provided with a chamber or receptacle, a clearing-blade, a roller, a scraping-knife, a surface-plate partially covering the bottom of the chamber and provided with apertures and holding said blade and knife to said body so that they project through the apertures of the plate, and a spring-controlled hand-lever hinged to the said body and carrying a plunger adapted to be operated in said chamber, as set forth.

2. A pointing-tool having a chamber, a plate forming the bottom of the chamber and having a discharge-opening under the chamber, said plate extending over the bottom surface of the tool, and provided with apertures, a roller, a clearing-blade projecting through the plate forward of the discharge-opening, a scraping-knife projecting through the plate in the rear of said opening, and a hand-lever having a plunger adapted to be operated in said chamber, as set forth.

3. A pointing-tool having a chamber, a plunger operated in said chamber, a plate detachably secured to the tool forming the bottom of the chamber and having a discharge-opening in the bottom of the chamber, a clearing-blade forward of the opening, a scraping-knife in the rear of the opening, and a roller mounted in the tool-body and projecting through the plate between the said opening and said rear knife, as set forth.

4. A pointing-tool having a chamber in one end, a spring-controlled lever pivotally hinged to the other end and provided with a plunger to fit the chamber, a surface-plate covering the bottom of the tool and forming the bottom of the chamber, said plate having an opening at the bottom of the chamber through which the contents of the latter is discharged, as set forth.

5. A pointing implement having a chamber in one end, and a spring-controlled lever pivoted at the other end carrying a plunger adapted to engage the chamber, a surface-plate covering the bottom of the implement and having a discharge-opening at the chamber-bottom, and provided with apertures, a clearing-blade in line with and forward of the discharge-opening, a roller revolubly secured in the body of the implement in line with and in the rear of said opening, a scraping-knife set at an angle across the line of said blade and roller and in the rear of the latter, said clearing-blade, roller, and scraping-knife projecting through the plate-apertures, as set forth.

6. A pointing implement having a chamber, a lever carrying a plunger, a plate covering the bottom of the implement and having a discharge-opening at the bottom of the chamber, a clearing-blade forward of and in longitudinal line with said opening, a roller, and a scraping-knife in rear of and at an angle to the blade across such line, said blade and knife being secured to the bottom of the implement by said plate and projecting through the latter, substantially as set forth.

7. A pointing-tool having a chamber, a plate having apertures and covering the bottom of the chamber, and having a discharge-opening in said bottom, a hand-lever connected by a spring to the end of the tool opposite the chamber to form a hinge and a pivot for the lever, a clearing-blade secured to the bottom of the tool in a line with said discharge-opening, a roller in the rear of and in line with the blade, and a scraping-knife in the rear of the roller across such line, said blade, roller, and knife projecting through said plate-apertures, substantially as set forth.

8. In a pointing implement, the combination of the body having a chamber at one end, a hand-lever having a plunger, a spring pivotally connecting the lever to the other end of the body, with a covering for the bottom of the chamber having a discharge-opening, a clearing-blade, a roller, and a scraping-knife secured to the bottom of the implement, as set forth.

9. In a pointing implement, the body having a chamber at one end, a spring and a housing therefor secured to the other end, a hand-lever having a plunger, and pivoted to the spring so as to be turned at right angles to the tool-body, combined with a bottom plate for the chamber having a discharge-opening, a clearing-blade forward of said opening, a scraping-knife in the rear of said opening, and a roller between the opening and the scraping-knife, said roller being journaled in the body of the tool and projecting beyond its bottom surface, and the said clearing-blade and scraping-knife being secured in cavities in the bottom of the tool, and also projecting beyond its surface, as set forth.

10. A pointing-tool having a chamber in one end, a discharge-opening in the bottom of the chamber, a clearing-blade projecting below, forward of and contiguous to said discharge-opening, and a hand-lever carrying a plunger and hinged to the end of the body opposite the chamber, as set forth.

In witness whereof I hereunto set my hand in the presence of two witnesses.

JOHN QUIGLEY.

Witnesses:
THOMAS J. EVANS,
WALTER Y. MERRICK.